(No Model.)

G. N. CLEMSON.
SAW.

No. 334,567. Patented Jan. 19, 1886.

WITNESSES:
C. Neveux
C. Sedgwick

INVENTOR:
G. N. Clemson
BY Munn & Co.
ATTORNEYS.

UNITED STATES PATENT OFFICE.

GEORGE N. CLEMSON, OF MIDDLETOWN, NEW YORK.

SAW.

SPECIFICATION forming part of Letters Patent No. 334,567, dated January 19, 1886.

Application filed October 27, 1885. Serial No. 181,061. (No model.)

*To all whom it may concern:*

Be it known that I, GEORGE N. CLEMSON, of Middletown, in the county of Orange and State of New York, have invented certain new and useful Improvements in Saws, of which the following is a full, clear, and exact description.

Reference is to be had to the accompanying drawings, forming part of this specification, in which similar letters of reference indicate corresponding parts in both the figures.

Figure 1:
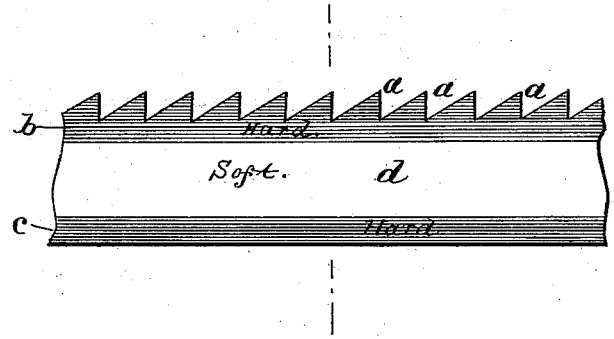
Figure 2:

Figure 1 is a side view. Fig. 2 is a transverse section of the saw made according to my improvement.

The object of my invention is to provide a saw for the use of butchers, metal-workers, and others requiring great hardness in the cutting-edges of the saw.

My improvement consists in a saw having opposite edges thereof hardened, and having a soft body between the edges.

In carrying out my invention I make the saw of sheet-steel in the usual way, with teeth $a$ upon one edge thereof, and I heat the saw in a suitable fire and simultaneously harden both edges, $b\ c$, of the saw in any well-known way, allowing the body $d$ of the saw to remain soft. When saws are hardened upon one edge only, the hardened edge becomes expanded, rendering that edge of the saw convex. This not only makes the saw inconvenient to use, but increases the liability to breakage. By hardening both edges of the saw and allowing the body of the saw to remain soft, the expansion of one edge of the saw due to hardening is opposed and counteracted by the expansion of the other edge of the saw, so that the saw remains straight, and by leaving the body of the saw soft and making the edges very hard I secure a cutting-edge which is very hard and durable, and at the same time produce a saw which is very tough and flexible, and not liable to break.

I do not claim in this application a saw hardened on one edge only, as the same is embraced in another application filed by me on the 29th day of December, 1885, Serial No. 187,022.

Having thus described my invention, what I claim as new, and desire to secure by Letters Patent, is—

A saw having hardened edges $b\ c$ and a soft body, $d$, substantially as herein specified.

GEORGE N. CLEMSON.

Witnesses:
GEO. M. HOPKINS,
C. SEDGWICK.